(12) United States Patent
Akita

(10) Patent No.: US 7,039,576 B2
(45) Date of Patent: May 2, 2006

(54) SYSTEM VERIFICATION EQUIPMENT, SYSTEM VERIFICATION METHOD AND LSI MANUFACTURING METHOD USING THE SYSTEM VERIFICATION EQUIPMENT

(75) Inventor: Yohei Akita, Kokubunji (JP)

(73) Assignee: Renesas Technology Corporation, Tokyo (JP)

( * ) Notice: Subject to any disclaimer, the term of this patent is extended or adjusted under 35 U.S.C. 154(b) by 816 days.

(21) Appl. No.: 09/987,317

(22) Filed: Nov. 14, 2001

(65) Prior Publication Data

US 2002/0059053 A1   May 16, 2002

(30) Foreign Application Priority Data

Nov. 15, 2000  (JP) .............................. 2000-348349

(51) Int. Cl.
  *G06F 17/50*   (2006.01)

(52) U.S. Cl. ............................ 703/19; 703/13; 703/14; 703/15; 716/1; 716/7

(58) Field of Classification Search ................. 703/13, 703/14, 15, 19; 716/1, 7; 709/217
See application file for complete search history.

(56) References Cited

U.S. PATENT DOCUMENTS

| | | | | |
|---|---|---|---|---|
| 5,867,399 | A * | 2/1999 | Rostoker et al. ............... | 716/18 |
| 6,102,961 | A * | 8/2000 | Lee et al. ........................ | 716/1 |
| 6,157,947 | A * | 12/2000 | Watanabe et al. ........... | 709/217 |
| 6,446,243 | B1 * | 9/2002 | Huang et al. ................... | 716/7 |
| 6,587,995 | B1 * | 7/2003 | Duboc et al. ................... | 716/4 |
| 6,634,008 | B1 * | 10/2003 | Dole ............................. | 716/1 |
| 6,654,935 | B1 * | 11/2003 | Ara et al. ....................... | 716/4 |
| 6,687,710 | B1 * | 2/2004 | Dey ........................ | 707/104.1 |
| 6,782,511 | B1 * | 8/2004 | Frank et al. .................... | 716/1 |

(Continued)

FOREIGN PATENT DOCUMENTS

JP     2002024311 A   *   1/2002

Primary Examiner—Fred Ferris
(74) Attorney, Agent, or Firm—Reed Smith LLP; Stanley P. Fisher, Esq.; Juan Carlos A. Marquez, Esq.

(57) ABSTRACT

A system designed, including commercially distributed modules protected as intellectual property (IP), is verified in a manner that the IP provider and the user communicate with each other over a communication line to complete the system design verification. A system verification equipment to be operated by the IP provider receives from the system designer across the communication line an input vector at time n to a module provided to the system designer who designed the system integrated using one or more provided IP modules. After simulating the module operation with the input vector, the verification equipment returns an output vector obtained at time n+1 to the system designer over the communication line. The verification equipment examines the input vectors to the provided IP modules and records statistics information thereof, based on which the provider will quantitatively understand how the provided modules have been used. Such information is used by the provider to determine the specifications of modules to be provided next time and to market modules meeting user needs. The verification equipment determines the service charge for each IP user by the quantity of load worked on its verification system to fulfill the service, according to the quantity of input vector data transmitted to the equipment by the user. Furthermore, the verification equipment encrypts vector data before transmitting it across the communication line and decrypts vector data after receiving it over the line such that the data is prevented from intercepted by a third party.

20 Claims, 9 Drawing Sheets

U.S. PATENT DOCUMENTS 6,904,527 B1* 6/2005 Parlour et al. .............. 713/189
2002/0073380 A1* 6/2002 Cooke et al. ................. 716/1
2002/0188910 A1* 12/2002 Zizzo ........................... 716/1
2003/0115564 A1* 6/2003 Chang et al. ................. 716/8

* cited by examiner

SYSTEM VERIFICATION EQUIPMENT, SYSTEM VERIFICATION METHOD AND LSI MANUFACTURING METHOD USING THE SYSTEM VERIFICATION EQUIPMENT

FIELD OF THE INVENTION

The present invention relates to equipment and a method for verifying an integrated system design, including in-house designed modules and at least one module protected as intellectual property (IP) and an LSI manufacturing method using such equipment. More particularly, the present invention relates to a couple of system verification equipment, one provided as the system designer's verification system and the other as the IP provider's verification system, both of which are interconnected by a communication line through which the former system requests the latter system to verify the provided module, and a system verification method using such equipment and an LSI manufacturing method using such equipment.

BACKGROUND OF THE INVENTION

In the field of system design, lately, the reuse of past design modules becomes popular to enhance the design efficiency. The system scale is diverse, ranging from a system LSI which is a system comprised of a plurality of modules/blocks mounted on a single LSI, a PC board-level system comprising a plurality of LSIs arranged on a printed circuit board, to an equipment-level system constructed by arranging the PC boards to be interconnected in a housing.

In designing a system of any scale in a short period of time, it is practical to record parts of the system as intellectual property and reuse them in designing another system later.

Lately, in more cases, a designer reuses not only modules previously designed by the designer but also design modules protected as intellectual property by a third party. Sales and distribution of design modules protected as intellectual property by a third party becomes popular.

Owing to the reuse and distribution of design modules protected as intellectual property, the efficiency of system design is enhanced considerably. However, because the systems to be designed becomes larger each year, a verification process for ensuring the system operates properly becomes complex.

To verify a system design, including design modules protected as intellectual property by third parties, it is necessary to verify all modules constituting the system, which may be reviewed in two phases: verifying the internal operation of each module and verifying module-to-module connections.

For newly designed modules, verification must be performed in both two phases. However, for reused modules protected as intellectual property, which are used as part of the system design, its module internal operation does not need to be verified, but the module-to-module connections need to be verified to ensure the whole operation of the system runs smoothly.

Logic simulation is applied widely and commonly as a means for carrying out system design verification. The logic simulation is performed by furnishing test vectors for operation verification to a simulator for ensuring system operating as expected.

When carrying out the logic simulation of a system, data for simulating the operation of all modules constituting the system is necessary. To simulate the operation of the components, either design data itself or a verification model that is an abstract representation based on the design data is required. If design data is used, the design data can be verified, but it takes rather long processing time to execute the simulation sequentially due to the detailed descriptions of the design data. In contrast, the verification model enables verification in shorter processing time because of its abstract or simplified representation of internal operation of a module. However, the design data of a third party module cannot be 100% verified with a verification model because of its abstract or simplified nature.

Thus, taking the above-mentioned phases of verifying modules into consideration, the prior art system verification is commonly carried out to apply design data for newly designed modules and a verification model for reused modules protected as intellectual property among the modules constituting the system. In this widely used manner, the entire system can be verified rapidly, and designs including module-to-module connections can be verified.

In most cases, the verification model is provided by the developer of the provided modules by a third party who owns the intellectual property, with or without charge. In most cases, the verification model is distributed in a storage medium, such as CD-ROM or the like, onto which it has been written.

However, the use of the verification model presents the following problems. First, secret information leaks out by disclosing the verification model. Secondly, the verification model is subject to modification or alteration during specification change or debugging. Thirdly, it is difficult to quantitatively review how the verification model has actually been used. Fourthly, a fixed charge is set for use of the verification model, according to the currently applied charging method, and it is expensive.

With respect to the first problem, the verification model is normally disclosed in this way: all data required for logic simulation is written onto a storage medium to be distributed. Once the storage medium is distributed to a user, the user can examine and apply the verification model beyond its normal usage (for system verification). Generally, generating a verification model falls in another technical field than system design. In the above manner in which the medium having all data of the verification model is delivered, there is a risk of leaking out of the technique for generating the verification model.

With respect to the second problem, the verification model simulates the interface operation of a module in a system according to actual data. If bugs were carried in the verification model, the simulation may be different from the actual module operation. In addition, module specification change may cause discrepancy between the existing verification model and the actual module operation.

With respect to the third problem, the provider of the verification model is usually the provider of design modules protected as intellectual property and may wish to quantitatively review how the provided modules have been used and obtain data thereof for marketing purposes. In the foregoing manner in which the medium having all data of the verification model is distributed, the provider cannot know how the verification model users have used the verification model.

With respect to the fourth problem, the current charge for the verification model includes the price of the storage medium with the verification model data and the charge for maintenance service rendered to its users. However, the users must pay a fixed rate whether the user will use the verification model repeatedly or only once and the charge is generally high. In consequence, this would be a problem particularly for those users who want to apply the verification model to a small system to introduce a test module, which use lacks any economy of scale.

SUMMARY OF THE INVENTION

In order to solve the foregoing problems and achieve the foregoing objects, the present invention provides, in one aspect, a system verification equipment to be operated by an intellectual property user to verify a system constructed with newly designed blocks which are protected as intellectual property by an outside entity. The system verification equipment implements a process of verifying the system operation, based on a method that comprises furnishing all system design data and input vectors to the system as input sequences and simulating the system operation with an input vector sequence furnished to the system, thereby obtaining an output vector sequence from the system in response to each input vector sequence. The process of verifying the system operation comprises the steps of dividing the time to be taken to simulate the system into a finite number of time steps, time 0 to time N. For each of the blocks constituting the system, supplying an input vector to the block at time n, while observing the internal state of the block at time n, computing an output vector from the block and its internal state at time n+1 (the beginning of the next time step), based on its design data or a verification model, integrating the output vectors from all blocks at time n+1, thereby obtaining an output from the entire system at time n+1, and repeating the computation from time 0 to time n, thereby computing an output vector sequence in response to the input vector sequence to the system. For each block provided by an outside entity, the system verification equipment transmits an input vector at time n to the block provider over a communication line such that the block provider simulates the block operation with the input vector at time n, thereby computing an output vector at the beginning of time n+1. The equipment receives the output vector from the outside entity at time n+1.

In the above system verification equipment to be operated by an intellectual property user, the operation of each provided block is not simulated. Instead, the equipment transmits the input vector of the block to the block provider so that the block provider will simulate the block operation with the input vector, and the equipment receives an output vector from the block provider.

In another aspect, the present invention provides a system verification equipment to be operated by an intellectual property user to fabricate an LSI according to the system design including blocks that are in-house designed with blocks protected as intellectual properties by an outside entity. The system verification equipment verifies whether the LSI operates as expected by simulating the LSI operation prior to fabricating the LSI. The process of verifying the LSI operation prior to its fabrication comprises the steps of determining input vectors to be furnished to the in-house designed blocks and the provided blocks, based on the input vectors to be input to the LSI; computing an output vector in response to an input vector furnished to each of the in-house designed blocks by simulating the block operation with the input vector and based on in-house design data stored in the system verification equipment; transmitting an input vector to be furnished to each of the provided blocks to the intellectual property provider over a communication line so that a destination system verification equipment operated by the intellectual property provider will simulate the block operation with the input vector, based on its design data or a verification model; receiving an output vector resulted from the simulation from the destination equipment over the communication line; and integrating the output vectors from the in-house designed blocks and the output vectors from the provided blocks into an output vector of the LSI.

The foregoing system verification equipment operated by an intellectual property user communicates with a similar equipment operated by an intellectual property provider via using a communication line, which can be an exchange communication line, the Internet, or a leased line.

The foregoing system verification equipment to be operated by an intellectual property user preferably encrypts vector data before transmitting it across the communication line and decrypts vector data after receiving it over the communication line, so that the data is prevented from being intercepted by a third party.

As to the system verification equipment to be operated by an intellectual property user, the target of design is to fabricate a LSI based upon the system design on a single LSI chip.

In yet another aspect, the present invention provides a system verification equipment to be operated by an intellectual property provider for verifying an integrated system design including in-house designed blocks, and blocks protected as intellectual property by an outside entity. The system verification equipment implements a process for verifying the system operation, based on a method that comprises furnishing input vectors to the system as input sequences and simulating the system operation with an input vector sequence, thereby obtaining a respective output vector sequence from the system in response to the input vector sequence. The system verification equipment comprises a system simulation mechanism for verifying the operation of the in-house designed modules and the modules protected as intellectual property. For each block provided, based on the internal state of the block at time n and the input vector to be furnished to the block at time n, which has been received over a communication line from a system verification equipment operated by the intellectual property user, the system simulation mechanism computes an output vector from the module and its internal state at time n+1, i.e., the beginning of the next time step. Then the system verification equipment operated by the IP provider sends the obtained output vector to the system verification equipment operated by the intellectual property user across the communication line.

In the above system verification equipment to be operated by an intellectual property provider, the system simulation mechanism is provided by running system simulation software on a general-purpose computer.

In the above system verification equipment to be operated by an intellectual property provider, hardware dedicated to system verification is used as the system verification mechanism.

In the above system verification equipment to be operated by an intellectual property provider, a previously developed module or system, such as an LSI or printed circuit board, is used as the system simulation mechanism.

The above system verification equipment to be operated by an intellectual property provider further comprises a user authentication mechanism for identifying the sender of an input vector to be furnished to the system designer before receiving the input vector over the communication line.

In the above system verification equipment to be operated by an intellectual property provider, the user authentication mechanism accepts only the vector data transmitted from a specific user who has already registered with the equipment.

In the above system verification equipment to be operated by an intellectual property provider, the user authentication mechanism identifies the sender of the input vector data and any changes of simulating block operation according to the result of identification.

The above system verification equipment to be operated by an intellectual property provider further includes a mechanism for detecting an illegal modification of or input to the module protected as intellectual property. The mechanism observes an input vector to be furnished to a block protected as intellectual property and detects any input vector that contravenes the intention of the designer of the provided block.

In the above system verification equipment to be operated by an intellectual property provider, upon the detection of the input vector that contravenes the intention of the designer of the provided block, its user authentication mechanism notifies the sender of the input vector that the input vector is invalid.

The above system verification equipment to be operated by an intellectual property provider monitors the received input vectors to the blocks protected as intellectual properties and records statistics information so as to quantitatively understand how often the provided blocks have been used and the determine the specifications of blocks to be provided next time.

In the above system verification equipment to be operated by an intellectual property provider, the service charge for each intellectual property user is determined by the quantity of load on its system simulation mechanism to fulfill the verification service.

In the above system verification equipment to be operated by an intellectual property provider, the service charge for each intellectual property user is determined by the quantity of load on its system simulation mechanism worked to fulfill the service according to the quantity of input vector data the user transmitted to the equipment.

The above system verification equipment operated by an intellectual property provider communicates with the similar equipment operated by an intellectual property user via a communication line which can be an exchange communication line, the Internet, or a leased line may be used.

The above system verification equipment to be operated by an intellectual property provider preferably encrypts vector data before transmitting it across the communication line, and decrypts vector data after receiving it over the communication line, so that the data is prevented from being intercepted by a third party.

A third party, that is other than the provider of blocks protected as intellectual property, may provide the above system verification equipment assumed to be operated by the intellectual property provider.

As the system verification equipment to be operated by an intellectual property provider, the system design is to be fabricated on a single LSI chip.

In another aspect, the present invention provides a system verification method to be used by an intellectual property user to verify a system design including newly designed blocks protected as intellectual property by an outside entity. The system verification method comprises computing output vectors in response to input vectors to the system for the newly designed blocks; for each provided block, transmitting an input vector to be furnished to the block at one time step to the block provider over a communication line such that the block provider simulates the block operation with the input vector by using its system simulation mechanism; receiving an output vector obtained at the beginning of the next time step resulted from the simulation; and integrating the output vectors from the newly designed blocks and the output vectors from the provided blocks into an output of the entire system.

In yet another aspect, the present invention provides a system verification method to be used by an intellectual property user for fabricating an LSI according to an integrated system design including in-house designed blocks and blocks protected as intellectual property by an outside entity. The system verification method comprises a process of verifying that the LSI operates as expected by simulating the LSI operation prior to fabricating the LSI. The process of verifying the LSI operation prior to its fabrication comprises the steps of determining input vectors to be furnished to the in-house designed blocks and the provided blocks, based on the input vectors to be input to the LSI; computing an output vector in response to an input vector furnished to each of the in-house designed blocks by simulating the block operation with the input vector generated based on in-house design data stored in the system; transmitting an input vector to be furnished to each of the provided blocks to the intellectual property provider over a communication line such that a destination system verification equipment operated by the intellectual property provider simulates the block operation with the input vector, based on its design data or a verification model; receiving an output vector resulted from the simulation from the destination equipment over the communication line; and integrating the output vectors from the in-house designed blocks and the output vectors from the provided blocks into an output of the LSI.

In still another aspect, the present invention provides an LSI manufacturing method for fabricating an LSI according to an integrated system design including in-house designed blocks and blocks protected as intellectual properties from an outside entity. The LSI manufacturing method comprises a process of verifying that the LSI operates as expected by simulating the LSI operation prior to fabricating the LSI. The process of verifying the LSI operation prior to its fabrication comprises the steps of determining input vectors to be furnished to the in-house designed blocks and the provided blocks, based on the input vectors to be input to the LSI; computing an output vector in response to an input vector furnished to each of the in-house designed blocks by simulating the block operation with the input vector generated based on in-house design data stored in the system verification equipment; transmitting an input vector to be furnished to each of the provided blocks to the intellectual property provider over a communication line such that a destination system verification equipment operated by the intellectual property provider simulates the block operation with the input vector, based on its design data or a verification model; receiving an output vector resulted from the simulation from the destination equipment over the communication line; and integrating the output vectors from the in-house designed blocks with the output vectors from the provided blocks into an output of the LSI.

Other and further objects, features and advantages of the invention will appear more fully from the following description.

BRIEF DESCRIPTION OF THE DRAWINGS

The preferred embodiments of the present invention are illustrated in the accompanying drawings in which.

DETAILED DESCRIPTION OF THE PREFERRED EMBODIMENTS

With reference to the appended drawings, preferred embodiments of the present invention are described below.

(1) Embodiment 1

A preferred Embodiment 1 of the system verification equipment of the present invention is described with reference to FIGS. 1 and 2.

Figure 1:
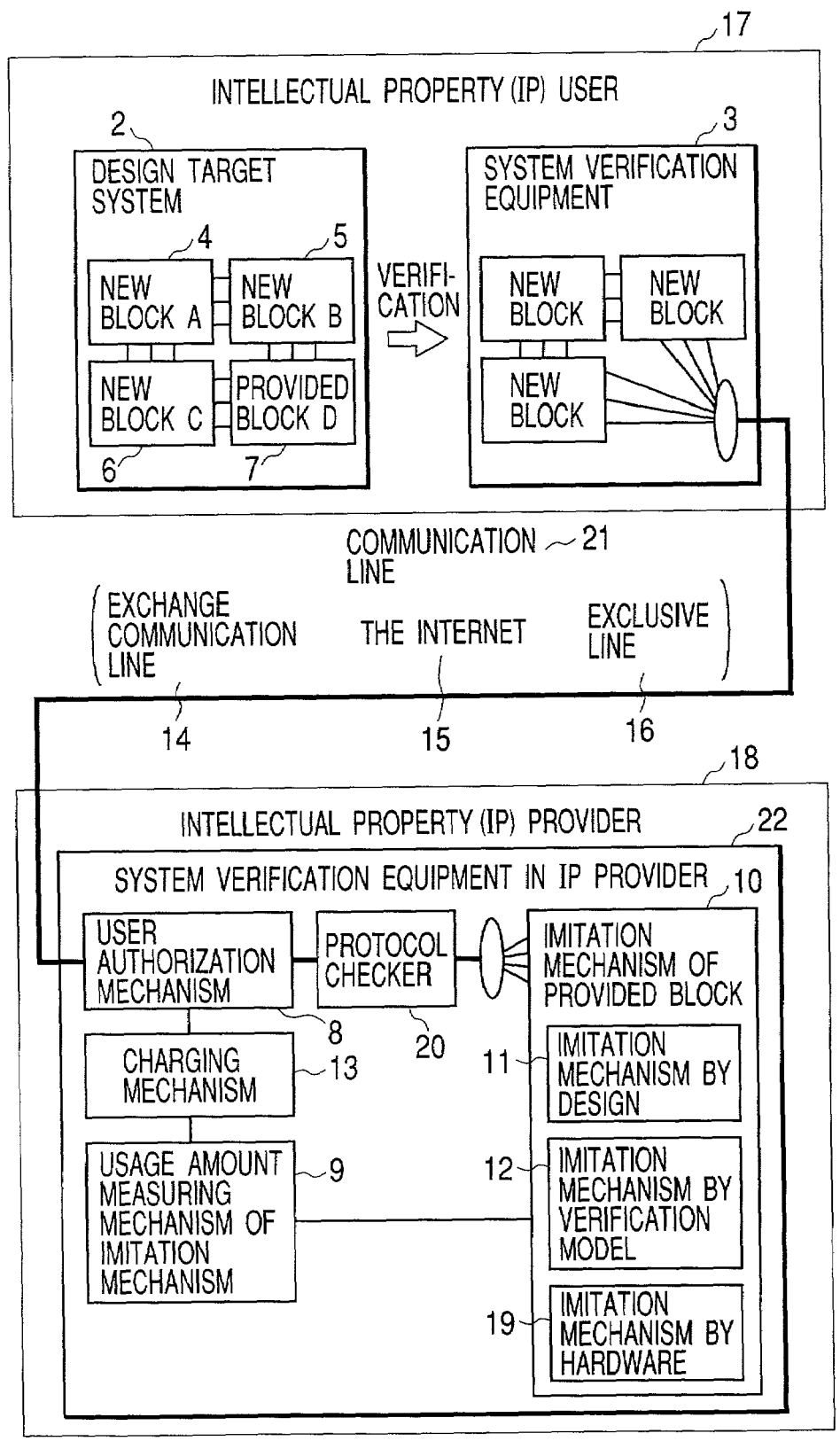
FIG. 1 is a conceptual diagram of one embodiment of the system verification equipment of the invention interconnected by a communication line.
Figure 2:
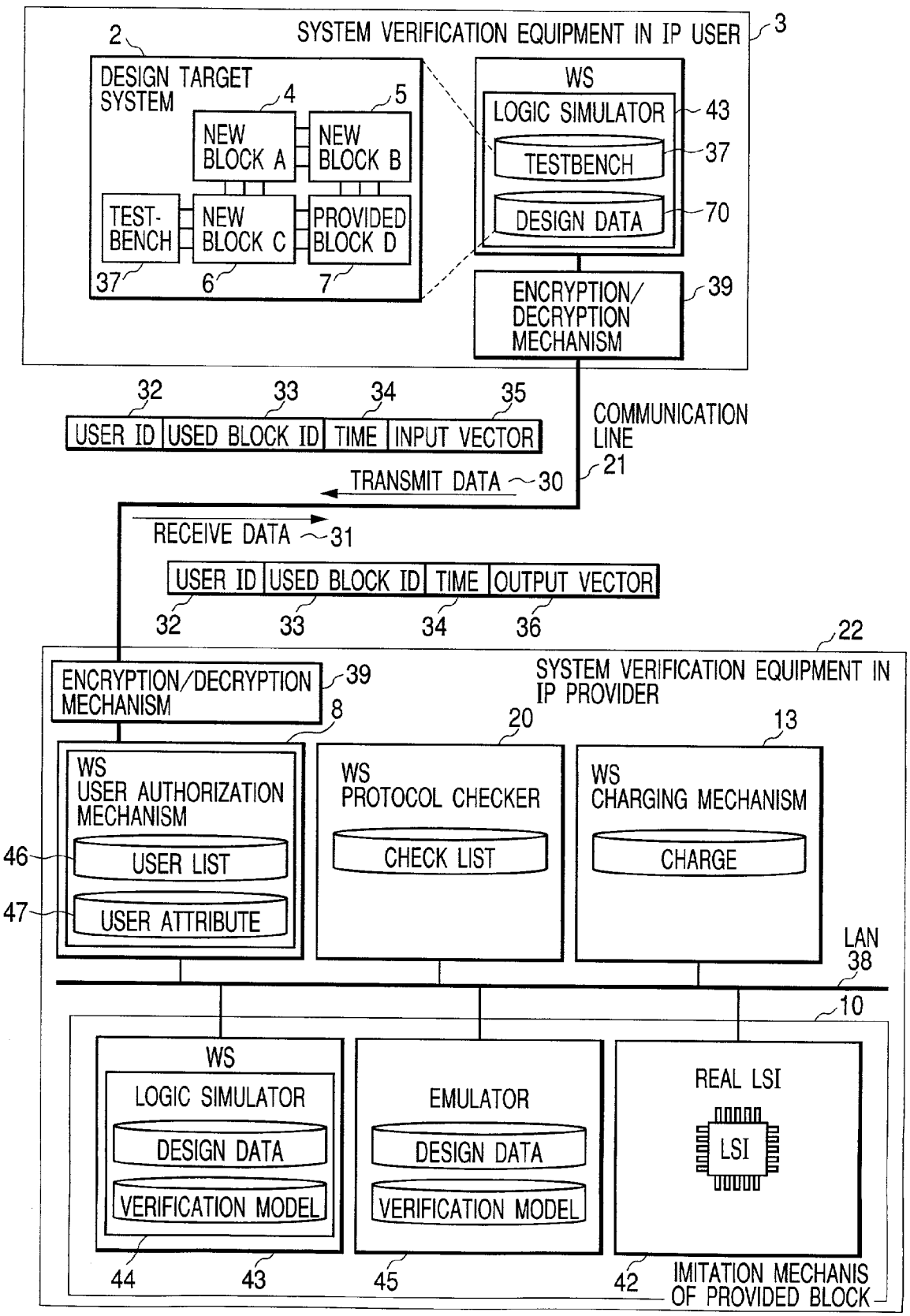
FIG. 2 is a diagram showing a preferred structure of the system verification equipment in FIG. 1.

FIG. 1 shows a conceptual diagram of the present invention, and FIG. 2 shows its illustrative structural diagram. A system verification equipment 3 to be operated by an intellectual property (IP) user is presented on the upper side of FIGS. 1 and 2. In FIGS. 1 and 2, another system verification equipment 22 to be operated by an intellectual property (IP) provider is presented on the lower side. The following explanation of Embodiment 1 focuses on the system verification equipment 3 to be operated by an intellectual property (IP) user. The system verification equipment 22 to be operated by an intellectual property (IP) provider will be explained in detail later in Embodiment 2.

To explain Embodiment 1, an illustrative example is used provided where a system designer creates three new blocks (A4, B5, and C6) and receives block D7 protected as an intellectual property by an outside entity, and then combines the new blocks with the provided block so as to develop a system design. The system for verifying the system design is explained as follows.

The design target system 2 consists of four blocks A to D (respectively identified by reference numerals 4, 5, 6, and 7 in FIGS. 1 and 2). Among these blocks, blocks A to C are newly designed by the system designer and must be verified for both operation and block-to-block connections. Therefore, based on their design data, the blocks A to C are verified for their internal operations and inter-block interfaces. On the other hand, the block D7 need not be verified for its internal operation by the designer's system (but by the provider's system), but only its connection to other blocks.

As shown in FIG. 2, an actual setup for verifying these blocks with data inputs includes a test bench 37 for supplying input vectors to these blocks except the blocks A to D.

The design data and test bench are furnished as input data to a logic simulator 43 that operates on a workstation (abbreviated to "WS" hereinafter). The logic simulator employs software that simulates the block or system operation according to the furnished design data to the WS. Although input vectors, in addition to design data, are usually furnished as inputs, the input vectors are not inputted in this example because they are generated by the test bench 37 (the detail on the input vectors will be explained later with FIG. 3).

The logic simulator 43 starts simulation from time 0 and computes a system output at time 1 or later. The system output is obtained by integrating the computed outputs of the blocks. The way of obtaining the output of each block varies, depending on whether the block is in-house designed or provided by an outside entity.

For the in-house designed block, its output is obtained by simulating the operation with the in-house system verification equipment 3 based on its design data.

For the block protected as intellectual property by an outside entity, an input vector to the block is transferred to the system verification equipment 22 to be operated by the intellectual property (IP) provider over a communication line 21. When the input vector is transferred, the transmitted data consist of an user ID 32, an used block ID 33, time 34, and an input vector 35 given in a specified format. The user ID 32 is an ID number that the IP-provider-side system verification equipment 22 has assigned to the IP user for user identification previously, and it is used for user authentication or the like. The used block ID 33 is an ID for identifying the block (intellectual property) provided from an outside entity. This information is to inform the provider what block for which the output vector is now requested when the system verification equipment executes output vector computation for a plurality of provided blocks. The time 34 indicates a specific time during logic simulation. The input vector to be furnished to the target block is transmitted.

Upon receiving of the transmitted data 30 from the system design side, the IP-provider-side system verification equipment 22 generates an output vector by furnishing the input vector 35 to the block identified by the used block ID 33 (the details will be explained in Embodiment 2). The obtained output vector 36 is packaged into a receive data 31 in a specified format consisting of the user ID 32, the used block ID 33, the time 34, and the output vector 36 as shown in FIG. 2. The receive data 31 is transferred to the IP-user-side system verification equipment 3 over the communication line.

When transferring the vector data over the communication line, the data is encrypted before the transfer and decrypted after the transfer by using a encryption/decryption mechanism 39. This prevents secret information from leaking out by data interception.

As the communication line, a leased line 16, an exchange communication line 14, or the Internet 14, as mentioned in FIG. 1, may be used. If the line is used frequently and the associated cost is not a concern, the leased line 16 should be used. If priority is given to convenience and low communication cost, the Internet 15 should be used. If convenience is desirable but the information leakage is a concern, the exchange communication line 14 is recommended.

The output vectors from all blocks are obtained accordingly, and an output vector of the whole system is obtained by integrating all output vectors. By repeating the process of obtaining these vectors, a system output sequence in response to the sequential input vectors is obtained.

Figure 3:
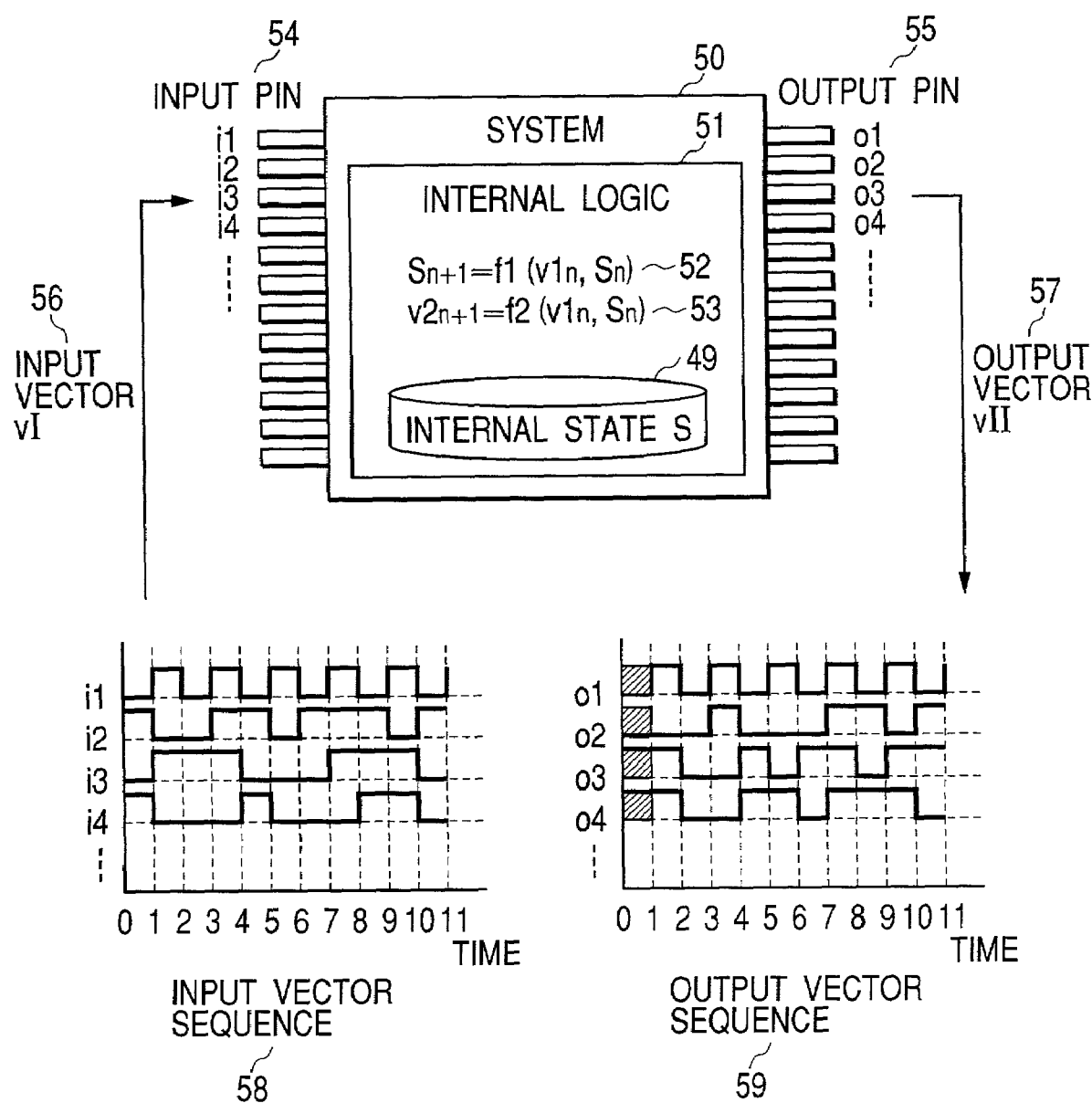
FIG. 3 is a diagram representing input to and output from an LSI to be fabricated according to the integrated system design verified by the equipment of FIG. 1.

FIG. 3 depicts supplying input vectors to a system 50. The system 50 has input pins 54 and output pins 55. Some systems include other input/output pins, but these pins are omitted herein because input/output pins are generally in pairs (input pins 54 and output pins 55) that logically operate in two opposite directions, and a model of the input/output pins can be created by the pairs of input pins 54 and the output pins 55.

The input to the system 50 at any given time includes the state values of signals inputted to all input pins 54 at the time. Because, commonly, there are a plurality of input pins 54, the combination of these values is expressed as an input vector represented as an input vector vI 56 in the present embodiment. Similarly, the output from the system is the combination of the output values appearing at a plurality of output pins at any given time which is expressed as an output vector. This is represented as an output vector vII 57 in the present embodiment.

The relation between the input vector vI 56 and the output vector vII 57 is determined by the internal logic 51 of the system 50. If the internal logic 51 of the system is expressed in terms of a state machine, the output vector vII 57 from the system 50 at time n+1 is determined by the input vector vI 56 at time n and the internal state S49 at time n. The internal state S49 is the system internal state determined by combining of the past input vectors vI 56. The system internal state and the output vector are respectively expressed as in equations 52 and 53 given in FIG. 3.

From the perspective of the system user, the input to the system is the combination of sequential input vectors vI 56, and the output from the system is the combination of sequential output vectors vII 57. These are respectively referred to as an input vector sequence 58 and an output vector sequence 59. These sequences correspond to the time-dependent changes of the input vector vI 56, and the output vector vII 57, which can be expressed in the time charts shown at the lower side of FIG. 3.

The operation of the system verification equipment 3 to be operated by an intellectual property (IP) user shown in FIG. 2 is described as follows.

Figure 7:
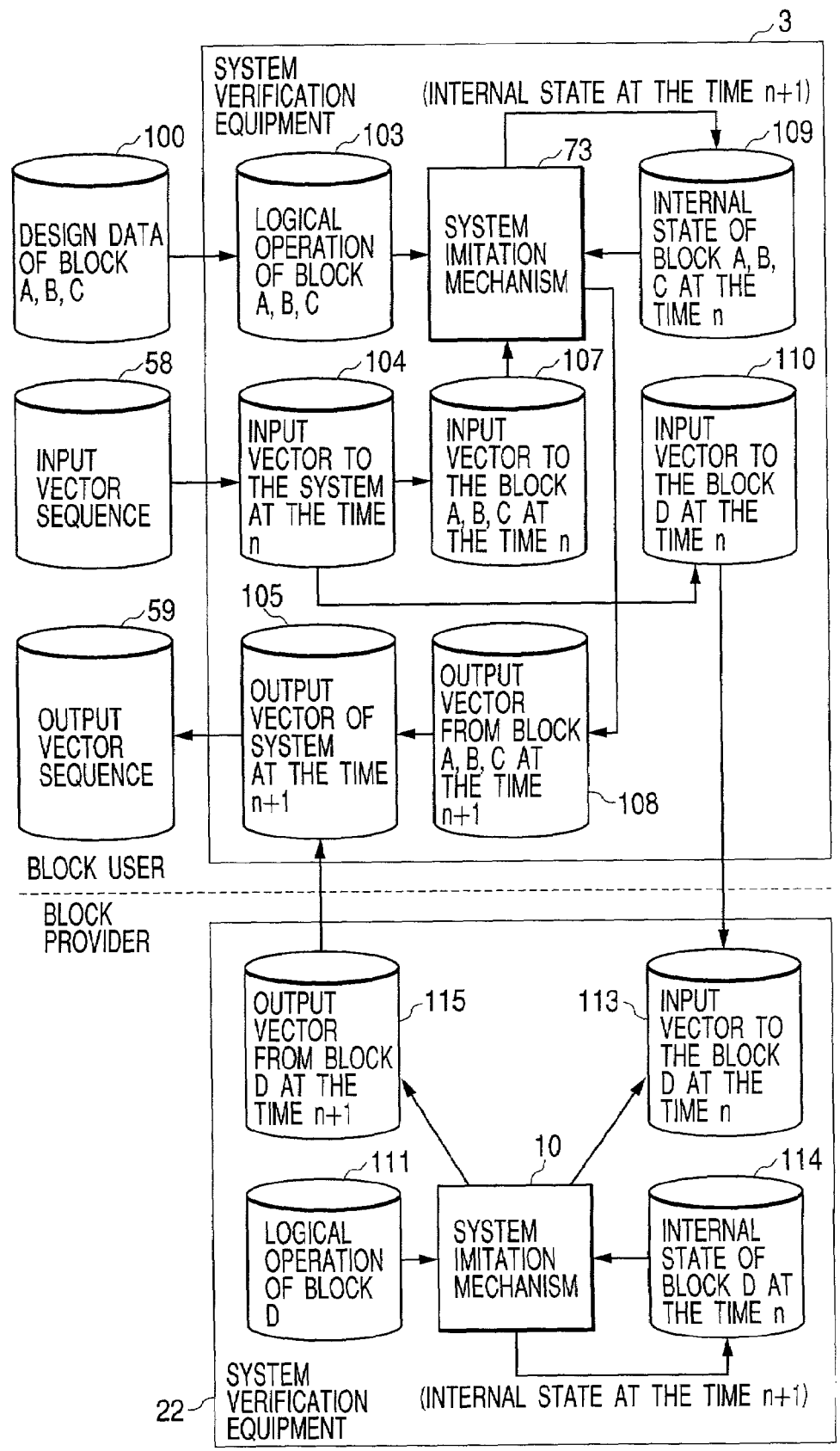
FIG. 7 is a diagram representing data flow between the system verification equipment (at the system designer's end and at the intellectual property provider's end) interconnected by a communication line.

FIG. 7 represents the flow of data in the present equipment. Design data for blocks A, B, C and an input vector sequence 58 to the system are inputted to the equipment, and an output vector sequence 59 from the system is obtained as the output. To simulate the system state at time n+1, the system verification equipment 3 at the system designer's end performs the processing as described below.

Based on the logic operation of blocks A, B, C 103 extracted from the design data 100 and the input vectors 106 to blocks A, B, C at time n 107 extracted from the input vector at time n 104 (derived from the input vector sequence 58) the equipment computes output vectors from blocks A, B, C at time n+1 108 and the internal state at time n+1 by using its system simulation mechanism 73. At the same time, the equipment transfers the input vector to block D at time n 110 to the system verification equipment 22 operated by the block provider and waits for a reply including an output vector 115 from the block D at time n+1. After receiving the reply including the output vector 115 from the block D at time n+1, the equipment integrates the output vector 115 with the output vectors 108 from the blocks A, B, C at time n+1, thus generating an output vector 105 of system at time n+1. By repeating the above process, the equipment generates an output vector sequence 59 from the system.

The block provider's equipment receives the input vector 113 to the block D at time n from the block user's system verification equipment 3, based on the internal state 114 of the block D at time n held inside the provider's verification equipment, and uses the system simulation mechanism 10 and the logic operation of the block D 111 to generate, an output vector 115 from block D at time n+1 and the internal state at time n+1. The output vector from block D at time n+1 is then sent to the block user's system verification equipment 3.

For communication between the block user's verification equipment and the provider's verification equipment, the communication line 21 can be a leased line 16, an exchange communication line 14, or the Internet 14, as mentioned in the example shown in FIG. 1. If the line is used frequently and the associated cost is not a concern, the leased line 16 should be used. If priority is given to convenience and low communication cost, the Internet 15 should be used. If convenience is desirable but the information leakage is a concern, the exchange communication line 14 is recommended.

Figure 4:
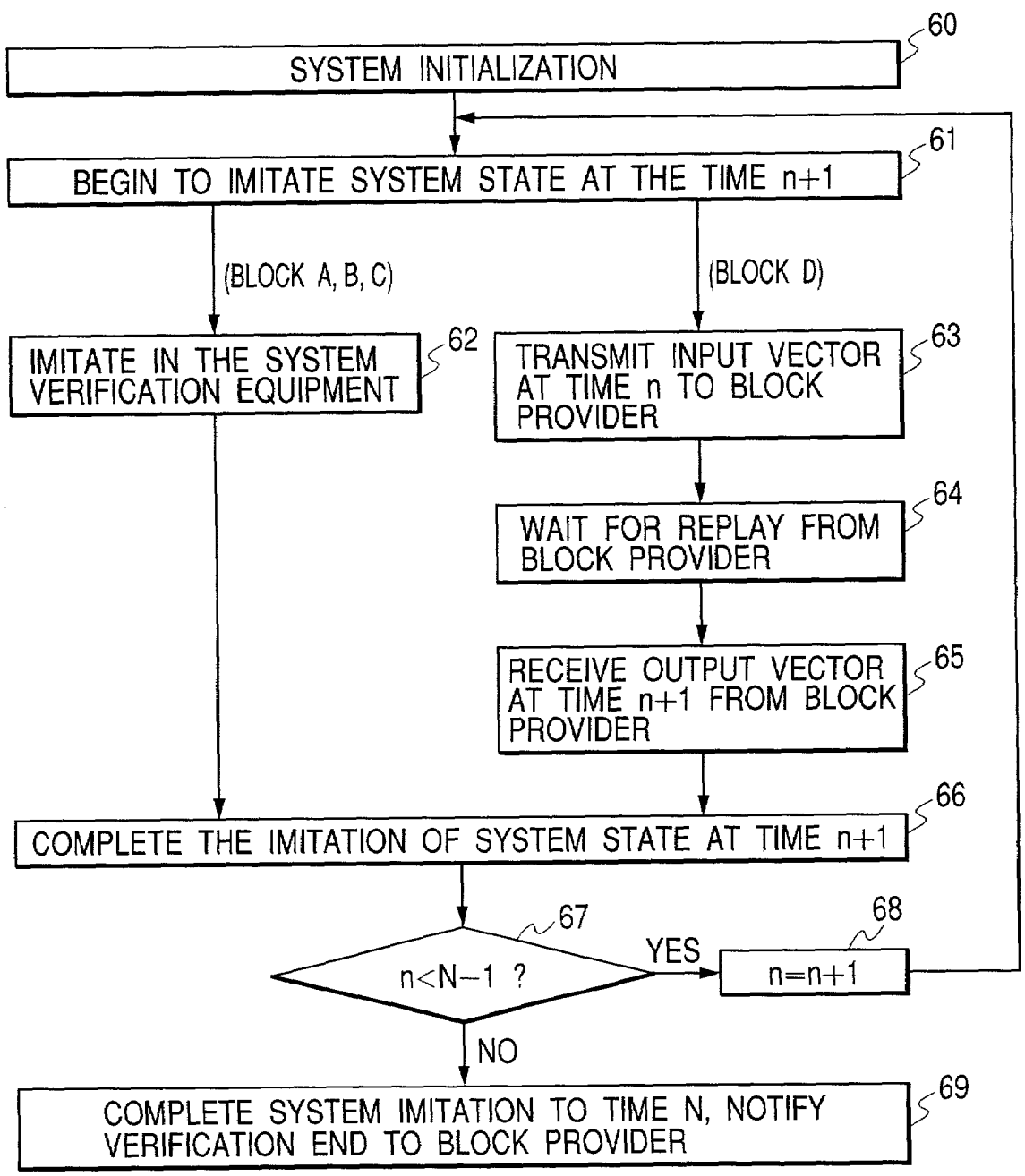
FIG. 4 is a flowchart illustrating the operation flow of the system verification equipment (at the system designer's end) connected to the other end through a communication line.

FIG. 4 is a flowchart illustrating the operation flow of the present equipment (operated by the intellectual property user). The present system operates while communicating with the block provider.

The present verification system 3 divides the time for verifying a designed system by simulating its operation into steps from time 0 to time n, and the system operation is carried out sequentially in steps.

Figure 5:
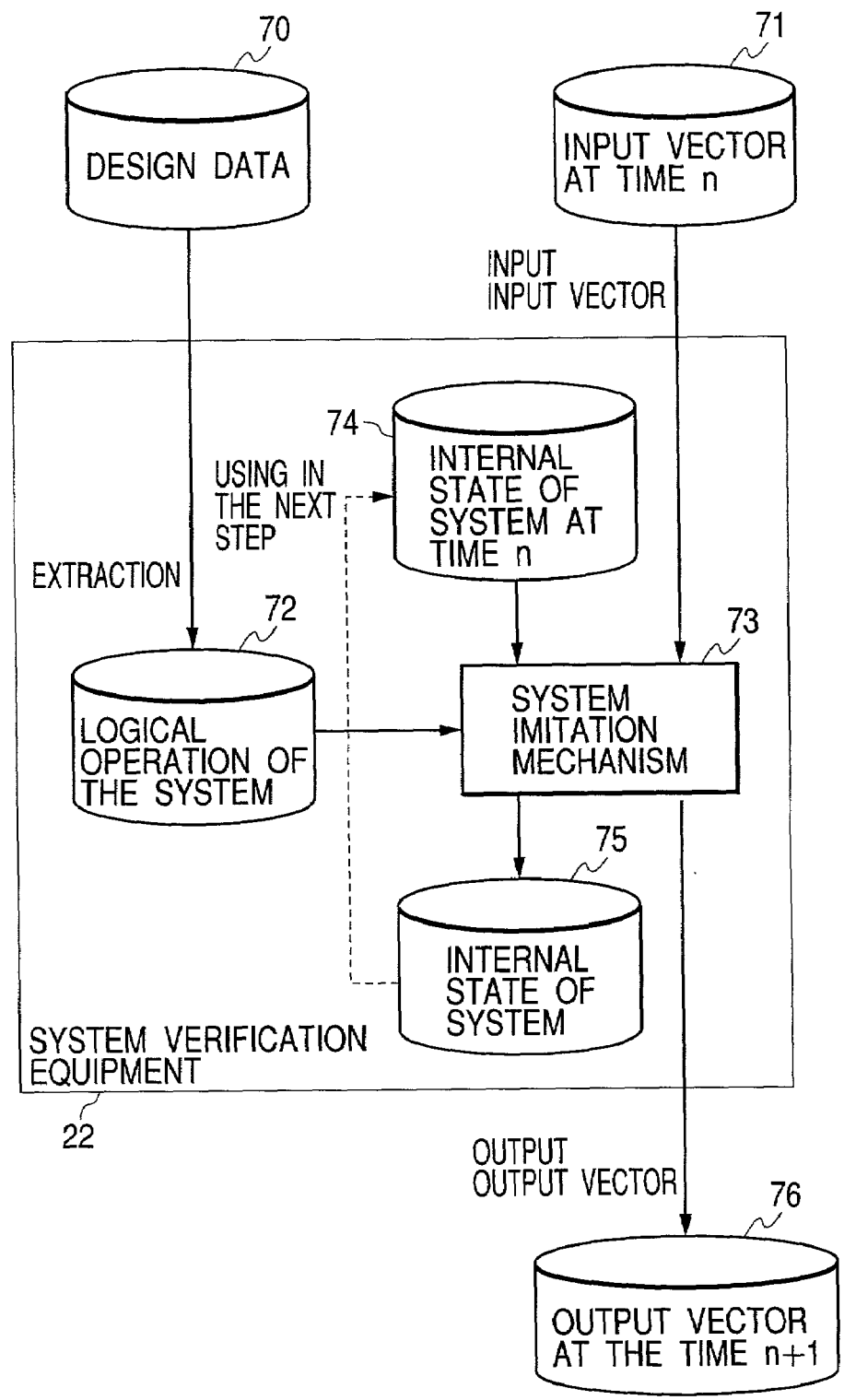
FIG. 5 is a diagram representing data flow on the system verification equipment (at the system designer's end) connected to the other end through a communication line.
Figure 6:
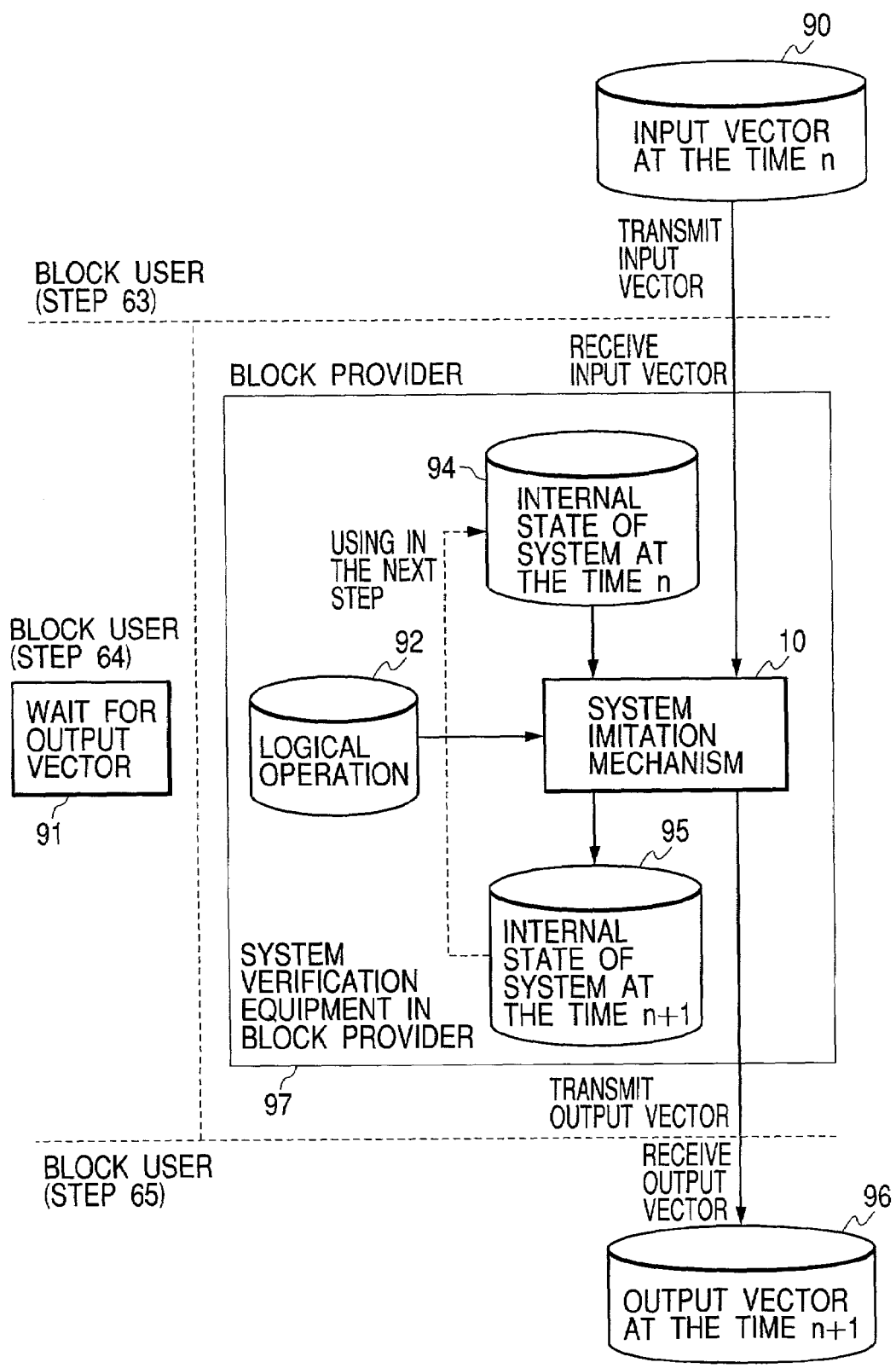
FIG. 6 is a diagram representing data flow on the system verification equipment (at the intellectual property provider's end) connected to the other end through a communication line.

Each of the steps of the operation flow shown in FIG. 4 will be discussed in details, and the related data flows which are illustrated in FIGS. 5 and 6 will be also referred to.

Step 60: Time variable n is set at 0. At the same time, the system internal state is initialized. Notice of "verification start" is given to the block provider 22.

Step 61: Simulating the system state at time n+1 begins. The system state at time n+1 corresponds to the internal state of system at time n+1 75, and an output vector 76 from system at time n+1 is given in FIG. 5. The system simulation is performed by sequentially simulating the internal blocks of the system. The simulation process splits, depending on whether the internal block was designed in-house by the designer or provided from an outside entity. For the in-house designed block, the processing goes to step 62. For a block provided by an outside entity, the processing goes to step 63.

Step 62: For the in-house designed block, its operation is simulated in the in-house system verification equipment 3. Both the input vector at time n 71 and the internal state at time n 74 given in FIG. 5 are inputted to the simulation mechanism, and the system operation is simulated based on the data extracted from the design data 70 for the in-house designed system. Thereby, an output vector at time n+1 76 and an internal state 75 are obtained. The design data 70 is general system description using hardware description language (HDL) or schematics. The logical operation of the system is specified in either case. Using this description, the system simulation is performed.

Step 63: For the block provided an outside entity, the operation simulation is not performed by the in-house corporate equipment. Instead, the input vector at time n 9 to the block as given in FIG. 6 is transmitted to the block provider.

Step 64: The equipment waits for a reply from the block provider to which the input vector has been transmitted in the step 63 (this corresponds to the description 91 given in FIG. 6). During the waiting period, in the block provider's system verification equipment 97, the following is carried out: based on the logical operation 92 of the block provided, the system simulation mechanism 10 computes an internal state 95 and an output vector 96 at time n+1 from the input vector at time n 90 received from the block user's equipment and the internal state 94 at time n.

Step 65: The equipment receives the output vector 96 at time n+1 received from the block provider's system verification equipment as the reply to the input vector transmission in the step 63. This aspect is represented in FIG. 6.

Step 66: By completing the step 62 and the step 65 for all blocks, the output vectors from all blocks at time n+1 are obtained.

Step 67: The equipment decides whether there is any further step to be executed, i.e., whether the output vectors at time n has been computed. If all output vectors to be computed are complete, the processing goes to step 69. If not, the processing goes to step 68.

Step 68: The time variable n is set at n+1. The processing returns to the step 61 to carry out the system simulation for the next time step.

Step 69: The simulation of the entire system operation up to time N is complete. Then, the equipment notifies the block provider of the end of verification.

(2) Embodiment 2

Another preferred embodiment (Embodiment 2) of the system verification equipment of the present invention is described with reference to FIGS. 1 and 2.

In embodiment 2, it is assumed that a system designer who builds a system with intellectual property provided by an outside entity with newly created blocks. The environment for verifying such a system is explained as follows. The system designer verifies the blocks designed using the mentioned system verification equipment 3 and the equipment possessed by the entity. For blocks protected as intellectual property from outside, the designer does not verify them in-house. Instead, a provided block is verified by sending an input vector sequence to the intellectual property provider's verification equipment and receiving an output vector sequence over a communication line. This manner is practical because the provided blocks protected as intellectual property have been verified for their internal logic, and it is sufficient to verify them only for the interface with newly created blocks. In Embodiment 2, a preferred embodiment of the system verification equipment to be operated by the intellectual property (IP) provider in such environment is explained as follows.

FIG. 2 represents the overview of the preferred embodiment for system verification of the present invention. While FIG. 2 was referred to in explaining Embodiment 1, the following explanation of Embodiment 2 focuses on the system verification equipment 22 to be operated by an intellectual property (IP) provider presented on the lower side, which was not described in detail in Embodiment 1.

The overall flow of system verification process to be carried out by the system shown in FIG. 2 is the same as described in Embodiment 1. Following the arrival of transmit data 30 at the system verification equipment 22 to be operated by an intellectual property (IP) provider is explained below.

Upon receiving the transmit data 30, if the data has been encrypted, the IP-provider-side system verification equipment 22 decrypts it with the encryption/decryption mechanism 39 as described in Embodiment 1.

The decrypted data is delivered to a user authentication mechanism 8. The user authentication mechanism 8, a protocol checker 20, a logic simulator 44, an emulator 45, a real LSI 42, and other components are interconnected by a LAN (Local Area Network), and they operate with data transferred among them.

The user authentication mechanism 8 identifies the user of the equipment from which the transmit data 30 was sent. The user authentication mechanism 8 compares the user ID included in the transmit data 30 with the user ID entry in a user list 46 it maintains, and searches for a match. If a match is found in the user list 46, the sender of the transmit data 30 is proved to be a pre-registered user of the system verification equipment 22. In this case, output vector computation and protocol check are performed, based on the user information described as a user attribute 47. If the user ID is not found in the user list 46, the user is regarded as an unregistered user and the process of request is rejected. Alternatively, the unregistered user is treated as a guest user and only a limited function is provided according to the applicable scheme of system security.

When the user is authenticated by the user authentication mechanism, the received transmitted data 30 is processed by transferring the input vector included in it to the block simulation mechanism (a logic simulator 44, an emulator 45, and a real LSI 42) and the protocol checker 20.

The logic simulator 44, the emulator 45, and the real LSI 42 fill their roles of block simulation mechanism. They are common in respect of computing an output vector in response to the input vector to the block, but have different features in cost and operability. The logic simulator 44 has a relatively low cost and is easy to maintain, but its operation speed is low. The emulator 45 is a high-speed machine, and its maintenance is easy, but it is very expensive. The real LSI 42 is of high speed, but its maintenance is difficult, and it is expensive. These three simulation mechanisms should be selectively used for each user. What mechanism to be applied for what kind of users is determined depending on the user attribute 47 stored in the user authentication mechanism 8.

The protocol checker 20 examines an input vector to the block for operation simulation and ensures that the input is valid for the block. If the protocol checker 20 detects an invalid input vector to the block, it reports the detected invalid input to the user authentication mechanism. The user authentication mechanism then notifies the user that the input vector sent by the user is invalid.

The charging mechanism monitors the activities of on the block simulation mechanisms, such as the logic simulator 44, emulator 45, and real LSI 42, as well as the protocol checker 20 to measure the quantities of loads worked on the respective mechanisms to fulfill the service for each user. The quantities of loads on the respective mechanisms are determined, based on the length of an input vector inputted to the block and the time during which each mechanism worked or the like. The measured quantities of loads on the respective mechanisms are recorded in the charging mechanism. The recorded load quantities are recorded by the user authentication mechanism, notice thereof will be sent to each user later and a bill will be issued if the user is charged for any service.

The foregoing is the constitution of the present preferred embodiment.

Then, the operation of the block simulation mechanism in the system verification equipment 22 to be operated by the intellectual property (IP) provider is described. The operation, which is described below, is common for the logic simulator 44 and the emulator 45.

The data inputted to and outputted from the present mechanism are illustrated in FIG. 7. The data contents are the same as described in Embodiment 1.

Figure 8:
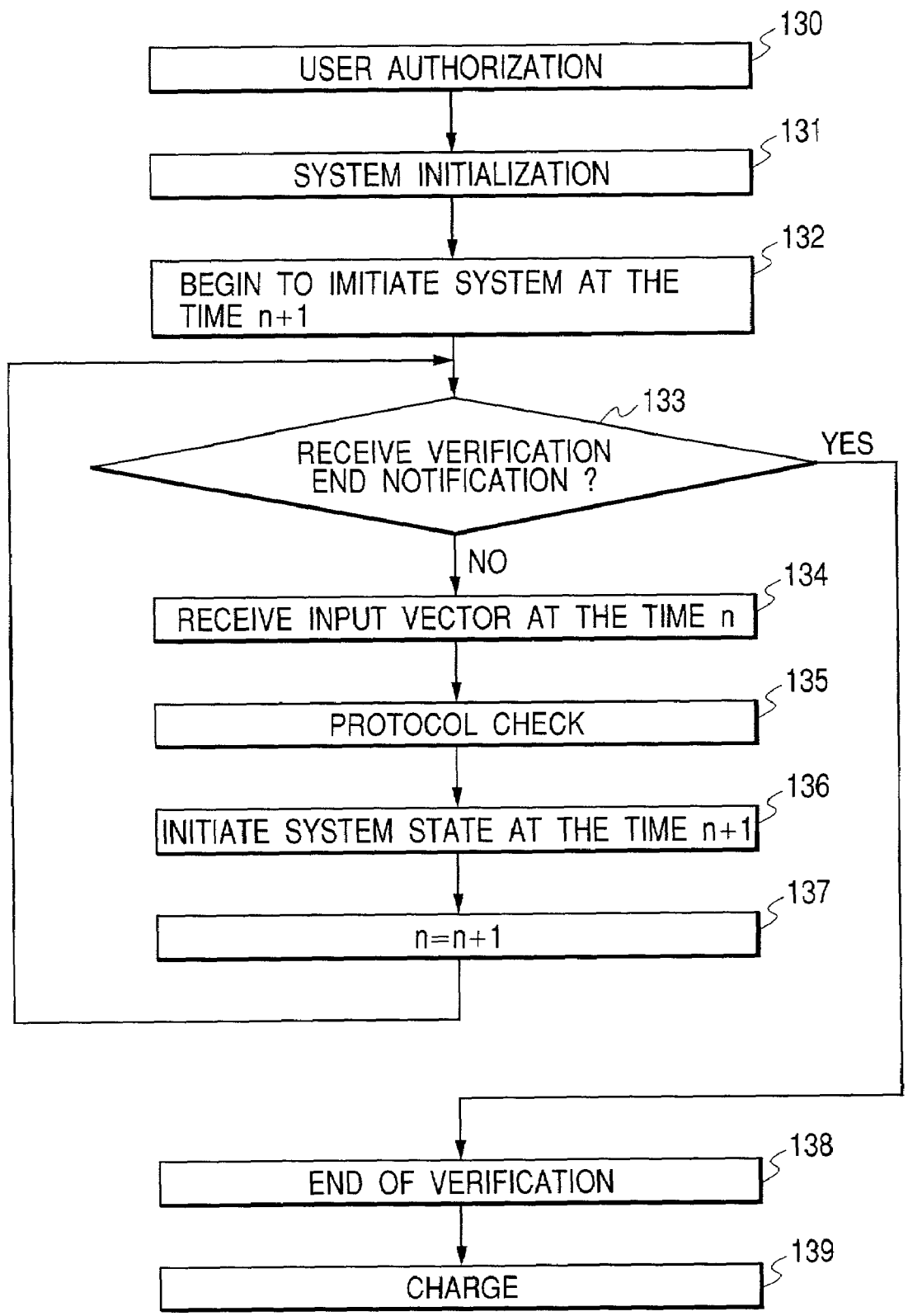
FIG. 8 is a flowchart illustrating the operation flow of the system verification equipment (at the intellectual property provider's end) connected to the other end through a communication line.

FIG. 8 is a flowchart illustrating the operation flow of the present mechanism. The operation flow is explained below.

Step 130: User authentication is performed by using the user authentication mechanism 8. It decides whether the user who accessed the present verification system 22, i.e., the system designer who builds a system using a provided module, is identified based on the ID data received over the communication line. Such authentication only identifies the user, and it is possible to permit any user to access the present system, or permit only the authenticated user as a pre-registered user, to access the system. At this authentication stage, any of the plurality of block simulation mechanisms (corresponding to the ones identified by 44, 45, and 42 in FIG. 2) of the present system verification equipment is selectively used.

Step 131: The system initialization is performed. The block subjected to operation simulation is initialized to fix its internal state and the initial state of input vector. Variable n, that represents a time step, is initialized to 0.

Step 132: The simulation process begins with computing the internal state and the output vector at time n+1 from the input vector and the internal state at time n.

Step 133: The equipment checks for the signal of "verification end" received over the communication line 21 from the user-end system verification equipment. If the equipment is notified of "verification end", the processing goes to step 138. In not, the processing goes to step 134.

Step 134: The equipment receives and records the input vector at time n to the provided block over the communication line 21 from the system designer's verification system 3. The received input vector is used for simulating the block and recorded as "block use event data" which will be referred to for specification examination when the block design is modified or its derivative version is designed.

Step 135: The protocol checker 20 checks to see whether the received input vector to the provided block is valid. If any illegal input is found, the equipment notifies the illegality to the sender of the input vector.

Step 136: The block simulation mechanism simulates by computing an output vector and internal state at time n+1, and using the received input vector at time n to the provided block and the internal state at time n. Among the plurality of block simulation mechanisms (44, 45, 42), the mechanism as determined in the step 130 is used.

Step 137: The variable n, that represents a time step, is incremented by one, then the processing returns to the step 133.

Step 138: The verification process terminates. The variable n is recorded as the indicator of how long the block simulation mechanism has been in operation.

Step 139: Fee charging is performed. Based on the variable n recorded in the step 138 and which simulation mechanism has been in operation, a service charge is determined to be specified on a bill to the user.

(3) Embodiment 3

A further preferred embodiment (Embodiment 3) of the system verification equipment of the present invention is described as follows.

Figure 9:
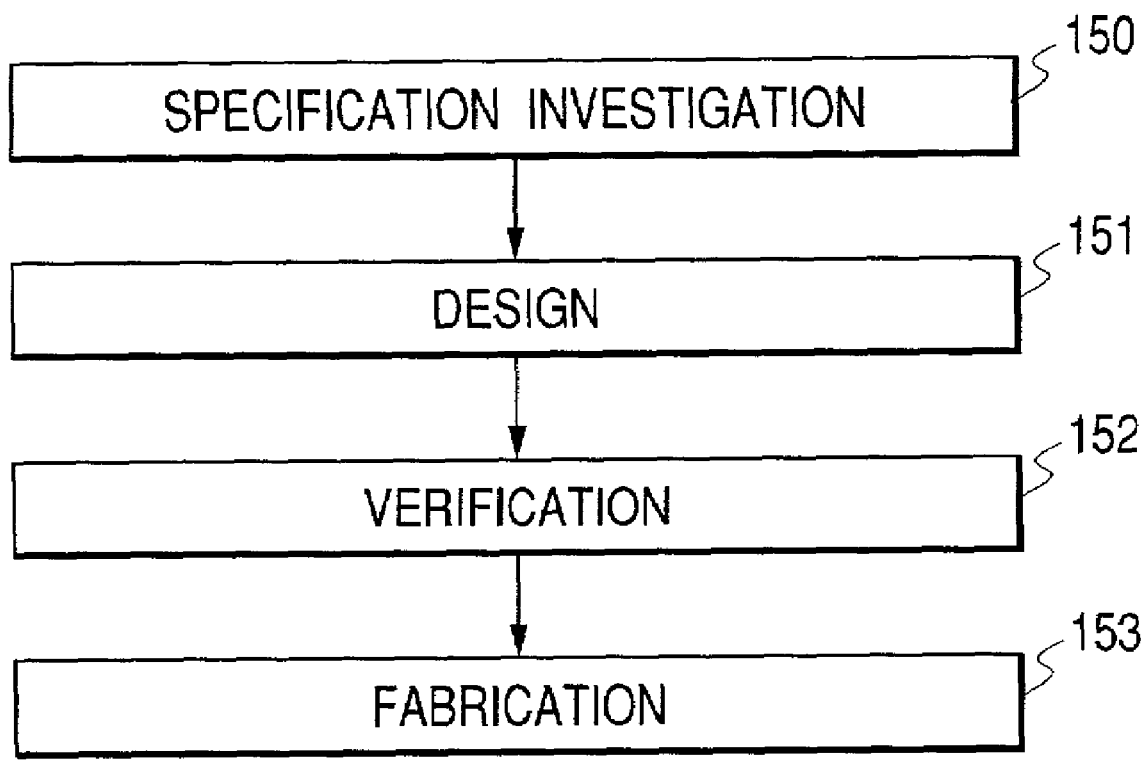
FIG. 9 is a flowchart representing the flow of designing and fabricating an LSI.

FIG. 9 represents an overview of a process for designing an LSI. In the phase of specification investigation 150, the specifications of the LSI are determined. Then, a design 151 is generated according to the specifications. After it is verified that the LSI design has properly been finished according to the specifications in the verification phase 152, the fabrication 153 of the LSI is carried out.

If the LSI specifications include a block or blocks protected as intellectual property by an outside entity as determined by the specification investigation, it is advisable to use the system verification equipment described in Embodiment 1 or 2 in the process of verification 152.

If an LSI system design is developed, part of which is made by using intellectual property provided from outside, the present invention is applied. Accordingly, the verification equipment to be operated by the intellectual property provider, on which a provider's proprietary verification model run, verifies the part of the design by receiving input vectors transmitted from the design developer, furnishing them to the verification simulation mechanism, and sending output vectors. This verification approach avoids sending the verification model to the design developer so as to prevent the secret information leakage problem. The specifications of the verification model can be altered, modified, or debugged simply by altering the model stored on the verification system of the provider without informing any user or causing any design inconvenience at the user's end.

Furthermore, the present invention is applied in such a manner that the statistics on the usage of the verification model run on the provider's verification system are recorded such that the verification model provider can quantitatively understand how often and how the provided intellectual property has been used. The recorded statistics data is used for analyzing the requirement/demand of blocks to be designed for future use. By measuring and recording cumulative time for which the verification model has been put in service for each user, the verification model provider can charge each user for the amount of service rendered to the user.

The present invention may be embodied in other specific forms without departing from the spirit or essential characteristics thereof The described embodiments are to be considered in all respects only as illustrated and not restrictive. The scope of the invention is, therefore, indicated by the appended claims rather than by the foregoing description. All changes which come within the meaning and range of equivalency of the claims are to be embraced within the scope of the claims.

What is claimed is:

1. A system verification method to be applied by an intellectual property user for verifying operation of an integrated system design constructed with modules designed in-house and at least one module protected as intellectual property of an outside entity, said verification method comprising:

providing design data or a verification model of each of the modules;

simulating the operation of the integrated system with one of the input vector sequences so as to obtain a respective output vector sequence, which includes the steps of:

dividing a simulation time period into a finite number of time steps in sequence from time 0 to time n;

supplying an input vector for said each of the modules at one time step, while observing an internal state of said each module at the respective time step;

computing an output vector from said each in-house designed module and the internal state at a starting time of a time step subsequent to the time step, based on the design data or the verification model;

transmitting an input vector for said each module of the outside entity to the outside entity at said one time step through a communication line such that the outside entity simulates operation of said each module with the input vector at said one time step so as to compute an output vector;

receiving the output vector from the outside entity through a communication line at a beginning of the subsequent time step;

integrating the output vectors from all modules at the subsequent time step to obtain an output of the whole system at the subsequent time step; and repeating the supplying, computing, transmitting, receiving and integrating steps from time 0 to time n sequentially to obtain an output sequence of the whole system.

2. A system verification equipment to be applied by an intellectual property user for verifying operation of an integrated system design constructed with modules designed in-house and at least one module protected as intellectual property of an outside entity, said equipment comprising:

storage medium for storing design data or a verification model of each of the modules;

simulating means for simulating the operation of the integrated system with one of the input vector sequences so as to obtain a respective output vector sequence, which includes:

dividing means for dividing a simulation time period into a finite number of time steps in sequence from time 0 to time n; supplying means for supplying an input vector for said each of the modules at one time step, while observing an internal state of said each module at the respective time step;

computing means for computing an output vector from said each in-house designed module and the internal state at a starting time of a time step subsequent to the time step, based on the design data or the verification model;

transmitting means for transmitting an input vector for said each module of the outside entity to the outside entity at said one time step through a communication line such that the outside entity simulates operation of said each module with the input vector at said one time step so as to compute an output vector;

receiving means for receiving the output vector from the outside entity through a communication line at a beginning of the subsequent time step;

integrating means for integrating the output vectors from all modules at the subsequent time step to obtain an output of the whole system at the subsequent time step; and repeating means for controlling the supplying, computing, transmitting, receiving and integrating means to repeat from time 0 to time n sequentially to obtain an output sequence of the whole system.

3. The system design verification equipment according to claim 2, further comprising manufactured LSI for fabricating at least one integrated circuit according to the verified integrated system design.

4. The system verification equipment according to claim 2, wherein said communication line includes at least one of an exchange communication line, the Internet, and a leased line.

5. The system verification equipment to be operated by an intellectual property user as recited in claim 2, wherein the input vector is encrypted before being transmitted across the communication then decrypted data after being received over the communication line.

6. The system verification equipment to be operated by an intellectual property user as recited in any of claim 2, wherein the integrated circuit design is constructed on one single integrated circuit chip.

7. A system verification equipment to be applied by an intellectual property provider for verifying operation of at least one module protected as intellectual property and included in an integrated system design in conjunction with modules designed in-house by an integrated system designer, said equipment comprising:

storage medium for storing design data or a verification model of said module;

receiving means for receiving an input vector sequence from the integrated system designer at one time step through a communication line;

simulating means for simulating the operation of the module with the input vector sequence so as to obtain a respective output vector sequence; and sending means for sending the output vector sequence to the integrated system designer through a communication line at a beginning of the subsequent time step, wherein, said time step and the subsequent time step are defined and supplied by the integrated system designer.

8. The system verification equipment according to claim 7, wherein said simulating means is provided by running a module simulation software on a general-purpose computer.

9. The system verification equipment according to claim 7, wherein at least one previously developed module is used in said system design.

10. The system verification equipment according to claim 7, further comprising a user authentication means for identifying a sender of the input vector sequence.

11. The system verification equipment according to claim 10, wherein said user authentication mechanism accepts only the input vector sequence transmitted from a user who has registered with the equipment.

12. The system verification equipment according to claim 11, wherein said user authentication mechanism further identifies the method of simulating module operation changes applied by the integrated system designer according to the result of identification.

13. The system verification equipment according to claim 7, further including a detecting means for detecting said input vector sequence any illegal use of or modification to the module that contravenes design intention of the module.

14. The system verification equipment according to claim 13, wherein, upon detecting the input vector sequence that contravenes the design intention of the module, the user authentication mechanism notifies the sender of the input vector sequence that the input vector sequence is invalid.

15. The system verification equipment according to claim 7, further comprising an analyzing means for recording and monitoring the input vector sequence for each said module thereby quantitatively analyzing how often the module has been used and determining specification of module to be provided later.

16. The system verification equipment according to claim 7, further comprising a service charge means for determining for each said integrated system designer by quantity of load on the simulating means for outputting the output vector.

17. The system verification equipment according to claim 16, wherein the service charge for each said integrated system designer is determined according to quantity of input vector data transmitted to the equipment.

18. The system verification equipment according to claim 7, wherein, as said communication line includes at least one of an exchange communication line, the Internet, and a leased line.

19. The system verification equipment according to claim 7, further comprising an encrypting/decrypting means for decrypting the input vector before the simulating then encrypting the output vector before sending over the communication line.

20. The system verification equipment according to claim 7, wherein a third party that is other than the intellectual property provider of the module applies said system verification equipment.

* * * * *